United States Patent Office 3,493,562
Patented Feb. 3, 1970

3,493,562
6α,7α;16α,17α - BIS - OXIDO - 16β - METHYL-4-PREG-NENE - 3,20 - DIONE AND METHOD FOR ITS MANUFACTURE
Hershel L. Herzog, Glen Ridge, and Elliot L. Shapiro, Cedar Grove, N.J., assignors to Schering Corporation, Bloomfield, N.J., a corporation of New Jersey
No Drawing. Filed Mar. 25, 1968, Ser. No. 715,533
Int. Cl. C07c *173/00, 169/34;* A61k *17/06*
U.S. Cl. 260—239.55                                13 Claims

ABSTRACT OF THE DISCLOSURE

6α,7α;16α,17α-bis-oxido-16β - lower alkyl-4-pregnene-3,20-diones are prepared by reaction of 16-lower alkyl-5,16-pregnadien-3β-ol-20-ones with an aromatic peracid or with alkaline hydrogen peroxide followed by subsequent treatment with an aromatic peracid. The 6α,7α;16α,17α-bis-oxido-16β-lower alkyl-4-pregnene-3,20-diones are valuable intermediates in the manufacture of 6-halogeno-16-alkylidene-17α - lower alkanoyloxy-4,6-pregnadiene-3,20-diones, which are valuable as progestational agents.

FIELD OF INVENTION

This invention relates to novel compositions of matter classified in the field of chemistry as 6α,7α;16α,17α-bis-oxido-16β-lower alkyl-4-pregnene-3,20-diones which are valuable as intermediates in preparing known, useful compounds, and to novel processes whereby these compositions of matter are prepared.

More specifically, this invention relates to 6α,7α;16α,17α-bis-oxido-16β - lower alkyl-4-pregnene - 3,20 - diones (particularly 6α,7α;16α,17α-bis-oxido-16β-methyl-4-pregnene-3,20-dione) which are valuable intermediates in preparing 6β-halogeno-7α,17α - dihydroxy-16-alkylidene-progesterones (and particularly 6β-chloro-7α,17α-dihydroxy-16-methylene-4-pregnene - 3,20 - dione) which, in turn, are valuable intermediates in preparing known, pharmacologically active compounds (e.g. 6-chloro-16-methylene-17α-acetoxy-4,6-pregnadiene-3,20-dione).

This invention also relates to the process of preparing 6α,7α;16α,17α-bis-oxido-16β-lower alkyl-4-pregnene-3,20-dione from 16β-lower alkyl-4,6,16-pregnatriene-3,20-diones by reaction with aromatic peracids (and preferably m-chloroperbenzoic acid).

DESCRIPTION OF THE PRIOR ART AS TO THE COMPOSITION-OF-MATTER ASPECT

Known in the art are compositions of matter in the field of steroid chemistry which possess either a 6α,7α-oxido-moiety or a 16α,17α-oxido-moiety. Also known in the art is the property possessed by these oxido derivatives of splitting upon treatment with acid to form vicinally substituted hydroxy derivatives which are either useful per se or as intermediates in preparing other useful compounds.

Thus, for example, in German Patent No. 1,156,407, there is described a process involving six reaction steps for preparing 6 - chloro-16-methylene-17α-acetoxy-6-dehydroprogesterone, i.e. 6 - chloro-16-methylene-17α-acetoxy-4,6-pregnadiene - 3,20 - dione (a known, potent progestational agent described and claimed in U.S. Patent No. 3,312,692) from 16-methyl-16-dehydroprogesterone (16-methyl-4,16-pregnadiene-3,20 - dione) which utilizes as intermediates, in two separate steps, first a compound possessing a 16α,17α-oxido moiety and, three steps later, a compound possessing a 6α,7α-oxido moiety. The transformations involved in this prior art process are shown diagrammatically as follows:

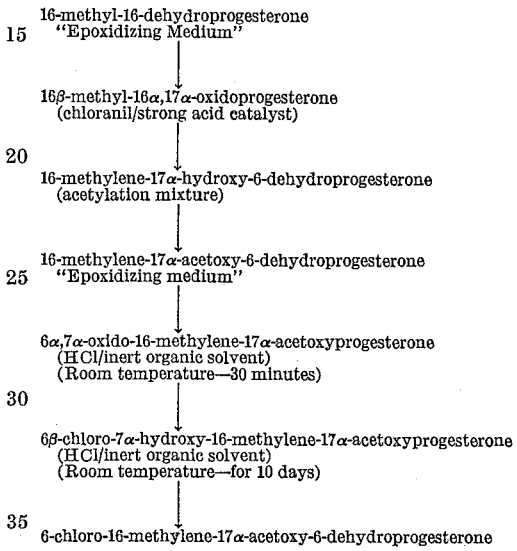

By our invention it is now possible to prepare in good yields and in one step a derivative possessing both a 6α,7α-epoxy- and a 16α,17α-epoxy group, i.e. 6α,7α;16α,17α-bis-oxido-16β-methyl-4-pregnene - 3,20 - dione from 16-methyl-4,6,16-pregnatriene-3,20-dione by reaction thereof with an aromatic peracid (and preferably with m-chloroperbenzoic acid).

Further, by our invention, we have discovered the use of 6α,7α;16α,17α - bis-oxido-16β-methyl-4-pregnene-3,20-dione as a valuable intermediate in an improved, novel process for preparing 6-chloro-16-methylene-17α-acetoxy-4,6-pregnadiene-3,20-dione (described and claimed in copending application of Hershel L. Herzog, Elliot Shapiro, and Lois Weber, Ser. No. 715,534 filed simultaneously herewith), wherein 6α,7α;16α,17α-bis-oxido-16β-methyl-4-pregnene-3,20-dione provides a means for simultaneously introducing two functional systems into the steroid molecule, i.e. the 6β-chloro-7α-hydroxy- and the 16-methylene-17α-hydroxy systems.

Thus, by combining the process of this application with that described in Herzog et al. Ser. No. 715,534 filed simultaneously herewith, it is now possible to convert 16-methyl - 5,16 - pregnadien - 3β - ol - 20 - one, a readily available intermediate, to 6-chloro-16-methylene-17α-acetoxy-4,6-pregnadiene-3,20-dione in but five reaction steps of good yields, which procedure is advantageously employed over prior art processes for preparing 6-chloro-16 - methylene - 17α - acetoxy - 4,6 - pregnadiene - 3,20-dione such as described hereinabove. The combined process is indicated diagrammatically as follows:

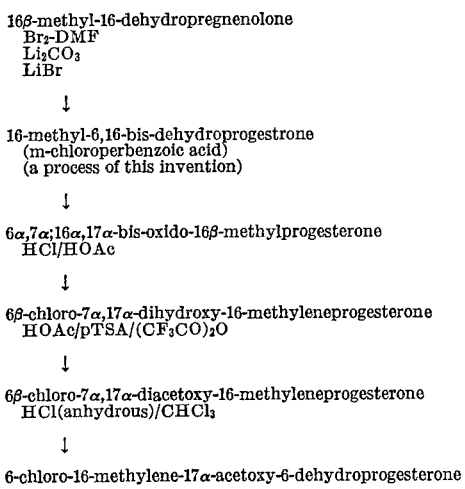

By the process of this invention, it is now possible to prepare in good yields (50–60%) 6α,7α;16α,17α-bis-oxido-16β - methyl - 4 - pregnene - 3,20 - dione from 16 - methyl-4,6,16-pregnatriene-3,20-dione in one step by the action of aromatic peracids (and preferably m-chloroperbenzoic acid). That m-chloroperbenzoic acid is the reagent of choice in our process is surprising in view of teaching in the art that m-chloroperbenzoic acid will selectively epoxidize double bonds other than those contained in an α,β-unsaturated ketone grouping such as the $\Delta^{16}$-20-keto system in the starting compound of our process.

By the process aspect of our invention, it is also possible to introduce the two epoxy groups by treatment first with aqueous alkaline hydrogen peroxide utilizing techniques similar to those known in the art followed by treatment of the 16α,17α-mono-epoxy thereby formed with an aromatic peracid, preferably m-chloroperbenzoic acid. This method of preparing the bis-oxido compound of our invention has the advantage of being a more economical process than the one-step species of our claimed process, since it uses less of the more costly aromatic peracid, meta-chloroperbenzoic acid.

SUMMARY OF THE INVENTION

Composition-of-matter aspect

The invention sought to be patented in its composition-of-matter aspect resides specifically in the concept of the chemical compound 6α,7α;16α,17α - bis - oxido - 16β-methyl - 4 - pregnene - 3,20 - dione (i.e. 6α,7α;16α,17α-bis - oxido - 16β - methylprogesterone) which is a valuable intermediate in novel processes described herein and claimed in co-pending application of Hershel L. Herzog, Elliot L. Shapiro, and Lois Weber Ser. No. 715,534 filed simultaneously herewith for preparing 6-chloro-16-methylene - 17α - acetoxy - 4,6 - pregnadiene - 3,20 - dione (a potent progestational agent described and claimed in U.S. Patent No. 3,312,692) which we have discovered, also possesses marked anti-androgenic activity, and is valuable in the treatment of benign prostatic hypertrophy, e.g. in the dog.

In standard pharmacological tests, 6-chloro-16-methylene - 17α - acetoxy - 4,6 - pregnadiene - 3,20 - dione demonstrates significant anti-androgenic activity via the oral, subcutaneous (s.c.), and intramuscular (i.m.) routes. For example, at 1 mgm./kgm. (s.c.) in the intact rat, 6-chloro - 16 - methylene - 17α - acetoxy - 4,6 - pregnadiene-3,20-dione reduces ventral prostate and seminal vesicle weights; at 25 mgm./kgm. (s.c.), this compound elicits anti-androgenic effects in orchitectomized testosterone-stimulated rats; and in the dog at 5 mgm./kgm. (i.m.) and at about 10 mgm./kgm. (orally), 6-chloro-16-methylene-17α - acetoxy - 4,6 - pregnadiene - 3,20 - dione elicits a marked effect on canine prostatic hyperplasia, reducing the prostate dimensions and reversing histological and histochemical changes associated with prostatic hyperplasia.

By means of the novel composition-of-matter aspect of this invention, it is now possible to simultaneously introduce into the molecule two functional systems, i.e. a 6β-chloro-7α-hydroxy system and a 16-methylene-17α-hydroxy system. Specifically, when 6α,7α;16α,17α-bis-oxido-16β-methyl-4-pregnene-3,20-dione is treated with anhydrous hydrogen chloride in a non-reactive organic solvent, as described in co-pending application of Hershel L. Herzog et al. Ser. No. 715,534 filed simultaneously herewith, there is formed 6β-chloro-7α,17α-dihydroxy-16-methylene-4-pregnene-3,20-dione also an intermediate in the aforementioned novel processes for preparing 6-chloro-16-methylene-17α-acetoxy-4,6-pregnadiene-3,20-dione.

Process aspect

The invention sought to be patented in its process aspect resides in the concept of the method for preparing 6α,7α;16α,17α - bis - oxido - 16β - methyl - 4 - pregnene-3,20-dione which comprises treating 16-methyl-4,6,16-pregnatriene-3,20-dione with an epoxidizing reagent selected from the group consisting of an aromatic peracid (whereby the 6α,7α;16α,17α - bis - oxido derivative of said pregnatriene is directly formed) and alkaline hydrogen peroxide followed by subsequent treatment of the 16α,17α-mono-oxido derivative thereby formed with an aromatic peracid.

A preferred species of the process aspect of our invention is that utilizing an aromatic peracid alone, particularly meta-chloroperbenzoic acid, as epoxidizing reagent.

By means of the process aspect of this invention it is now possible to prepare the heretofore unknown, valuable composition-of-matter aspect of this invention in good yields and of high purity. Additionally and advantageously, by the preferred species of this invention, i.e. treatment with meta-chloroperbenzoic acid alone, both the 6α,7α- and the 16α,17α-epoxy groups are introduced into 16β-methyl-4,6,16-pregnatriene-3,20-dione in one step.

GENERAL DESCRIPTION OF THE INVENTION

Composition-of-matter aspect

The tangible embodiment of the composition-of-matter aspect of the invention, i.e. 6α,7α;16α,17α-bis-oxido-16β-methyl-4-pregnene-3,20-dione, possesses the physical properties of being a white, crystalline solid essentially insoluble in water and soluble in organic solvents, particularly in methylene chloride and acetic acid, and of having a melting point of about 198° C., an optical rotation value ($[\alpha]_D$) of about +82.4° in a 1% dioxane solution, and the following ultraviolet absorption data:

$$\lambda_{max.}^{methanol}\ 240\ m\mu\ \epsilon\ 14,800.$$

The tangible embodiment of the composition-of-matter aspect of this invention (6α,7α;16α,17α - bisoxido-16-methyl-4-pregnene-3,20-dione) possesses the inherent, applied use characteristic that upon treatment thereof with anhydrous hydrogen chloride according to procedures described in co-pending application of Hershel L. Herzog et al. Ser. No. 715,534 filed simultaneously herewith, a carbon to oxygen bond in each epoxy group is split and there is formed both a 6β-chloro-7α-hydroxy and a 16-methylene-17α-hydroxy-system. The bis-oxido compound of this invention is thus valuable as an intermediate in the preparation of the potent progestational and anti-androgenic agent, 6-chloro-16-methylene-17α-acetoxy-4,6-pregnadiene-3,20-dione.

Process aspect

The manner of carrying out the tangible embodiment of the process aspect of this invention is generally described hereinbelow so as to enable one skilled in the art to make and use the same.

According to our process, 16-methyl-4,16-pregnatriene-3,20-dione is converted to the novel 6α,7α;16α,17α-bis-oxido derivative of this invention by treatment of the pregnatriene with an expoxidizing reagent of the group consisting of an aromatic peracid (and preferably meta-chloroperbenzoic acid) and of alkaline hydrogen peroxide in conjunction with subsequent treatment of the 16α,17α-mono-oxido derivative thereby formed with an aromatic peracid.

A preferred species of the process aspect of this invention is that utilizing aromatic peracids alone as the epoxidizing reagent since by this species of our process, the oxido functions at both C–6,7 and C–16,17 are advantageously introduced in one step, thus eliminating the necessity of isolating the 16α,17α-mono-oxido derivative formed upon reaction of the pregnatriene with alkaline hydrogen peroxide.

Aromatic peracids contemplated for use in the preferred species of the process aspect of our invention are such as m-chloroperbenzoic acid, p-chloroperbenzoic acid, m-nitroperbenzoic acid, p-nitroperbenzoic acid, p-cyanoperbenzoic acid, p-methoxyperbenzoic acid, p-methylperbenzoic acid, m-bromo-perbenzoic acid, 3,4-dichloro-perbenzoic acid, and perphthalic acid.

Of the foregoing, the aromatic peracid of choice is m-chloroperbenzoic acid because, when m-chloroperbenzoic acid is used as reagent in our process, there is produced high yields (around 50–60% theory) of a product of such purity that it can be used directly without further purification (e.g. crystallization or chromatography) as and intermediate in the preparation of 6-chloro-16-methylene-17α-acetoxy-4,6-pregnadiene-3,20-dione.

The starting compound for our process, 16-methyl-4,6,-16-pregnatriene-3,20-dione, is conveniently prepared from 16-methyl-16-dehydropregnenolone (16-methyl-5,16-pregnadiene-3β-ol-20-one) by reaction thereof with bromine in the presenece of a hydrogen bromide acceptor (e.g. magnesium oxide, alkali and alkaline earth carbonates such as lithium carbonate, and calcium carbonate, pyridine and quinoline) and an inorganic bromide salt in a basic solvent, preferably N-substituted amides such as N,N-dimethylformamide under reaction conditions similar to those known in the art. If a higher alkyl-pregnatriene is described as starting compound, e.g. 16-ethyl-4,6,16-pregnatriene-3,20-dione, it is prepared via the above procedure, but utilizing the corresponding 16-lower alkyl-pregnenolone (e.g. 16-ethyl-16-dehydropregnenolone) as starting compound.

The preferred mode of our process is as follows:

To 16-methyl-4,6,16-pregnatriene-3,20-dione in refluxing tertiary butanol there is added at least two moles of an aromatic peracid (preferably meta-chloroperbenzoic acid). From two to five moles of peracid per mole of pregnatriene is advantageously employed, from four to five moles of peracid being the preferred quantity. After allowing this mixture to react at reflux temperature for about 30 to 45 minutes, the 6α,7α;16α,17α-bis-oxido-16β-methyl-4-pregnene-3,20-dione thereby formed is isolated and purified by utilizing purification techniques known in the art such as those utilizing crystallization, extraction, and chromatographic techniques and there is obtained 6α,7α; 16α,17α-bis-oxido-16β-methyl-4-pregnene-3,20-dione in good yields (50–60%).

When epoxidizing with an aromatic peracid, e.g. meta-chloroperbenzoic acid, we prefer to use a non-reactive organic, solvent which, in the process of this application, is defined as an organic solvent which will not react with an aromatic peracid or the steroid substrate under the conditions of the reaction so as to cause transformations which would result in the occurrence of competing side reactions. Contemplated as included among the non-reactive solvents for use in our process are solvents such as hydrocarbons (e.g. benzene), halogenated hydrocarbons, (e.g. methylene chloride) and hydroxylated hydrocarbons (e.g. tertiary butanol).

Our process is usually carried out at from 70 to 90° C. for from one-half hour to about two hours, although any temperature in the range of from about 25° C. to about 100° C. may be employed. The course of the reaction may be followed via thin layer and spectroscopic data. In general, the higher the reaction temperature employed, the shorter is the time required for completion of the reaction.

Alternatively, the process of this invention is carried out by utilizing as epoxidizing reagent alkaline hydrogen peroxide followed by an aromatic peracid, e.g. meta-chloroperbenzoic acid. In this embodiment of our process 16-methyl-4,6,16-pregnatriene-3,20-dione is first converted to the 16α,17α-mono-oxido derivative via the action of alkaline hydrogen peroxide utilizing techniques known in the art, followed by reaction of the thereby formed 16β-methyl-16α,17α-oxido-4,6-pregnadiene-3,20-dione with a peracid, preferably m-chloroperbenzoic acid.

We have found in carrying out this embodiment of the process aspect of our invention that good results are obtained when 1.55 moles of 16-methyl-4,6,16-pregnatriene-3,20-dione in methanol/methylene chloride is allowed to react with about 4.9 moles of hydrogen peroxide (i.e. 500 ml. 30% aqueous hydrogen peroxide) in the presence of 2 moles of aqueous sodium hydroxide for about 4 hours at about 30° C. The resulting 16α,17α-mono-oxido derivative (i.e. 16β-methyl-16α,17α-oxido-4,6-pregnadiene-3,20-dione) is then isolated in good yields (82% theory) and high purity (M.P. 168° C.), utilizing techniques known in the art, a preferred isolation procedure being disclosed herein in Example 2. The 16α,17α-mono-oxido-pregnadiene is then dissolved in benzene to which is added at least an equimolar quantity of an aromatic peracid per gram steroid in tertiary butanol, meta-chloroperbenzoic acid being the reagent of choice. After allowing the mixture to react at reflux temperature for about 2 hours, isolation and purification of the novel 6α,7α;16α,17α-bis-oxido - 16β-methyl-4-pregnene-3,20-dione is carried out utilizing known techniques (as set forth in Example 3A) and there is obtained 6α,7α;16α,17α - bis-oxido-4-pregnene-3,20-dione in good yields (53.5% theory) and high purity (M.P. 198° C.).

Our invention disclosed above is exemplified in the following examples which describe in detail the preferred embodiments contemplated of the process sought to be patented whereby is prepared the novel compositon of matter sought to be patented. Our inventive concept is not to be construed as limited by the disclosure herein, since it will be apparent to those skilled in the art that modifications of the described invention may be practiced without departing from the purpose or intent of this disclosure.

Thus, for example, by the novel process described herein, by utilizing as starting compound 16-alkyl homologs of 16 - methyl-1,4,16-pregnatriene-3,20-dione, e.g. the 16β-ethyl, and 16β-n-propyl analog—there is prepared 6α,7α; 16α,17α - bis - oxido-16β-ethyl-4-pregnene-3,20-dione, and 6α,7α;16α,17α - bis - oxido-16β-n-propyl-4-pregnene-3,20-dione, respectively.

EXAMPLE 1

16-methyl-4,6,16-pregnatriene-3,20-dione

To a suspension of 31.5 g. of 16-methyl-5,16-pregnadien-3β-ol-20-one (M.P. 188° C.), 95 g. of lithium carbonate and 63 g. of lithium bromide in 450 ml. of dimethylformamide add, with stirring, over a 30 minute period, 30.8 g. of bromine dissolved in 200 ml. of dioxane. Stir the reaction mixture for two hours and fifteen minutes at 80° C. then cool to room temperature, filter and pour the filtrate into 6.5 liters of water containing 12 g. of sodium bicarbonate and 12 g. of sodium bisulfite. Filter the resultant precipitate comprising 16-methyl-4,6,16-pregnatriene-3,20-dione and dry at 60° C. Yield 28.8 g. Purify by crystallization from acetone-ethyl ether, M.P. 213–215° C. (sinters 209° C.) $[\alpha]_D +70.6°$ (dioxane)

$\lambda_{max.}^{methanol}$ 283mμ ϵ 25,100.

Yield=18.7 g. (60.5% theory).

EXAMPLE 2

16β-methyl-16α,17α-oxido-4,6-pregnadiene-3,20-dione

To a solution of 500 g. of 16-methyl-4,6,16-pregnatriene-3,20-dione (M.P. 213–215° C.) dissolved in a mixture of 10 liters of methanol and 5.75 liters of methylene chloride, add 500 ml. of 30% aqueous hydrogen peroxide, 1.5 liters of distilled water and 400 ml. of 5 N aqueous sodium hydroxide. Stir the reaction mixture at 30° C. for 4 hours, pour into 10 liters of water, and extract with methylene chloride. Wash the combined extracts with water, then with aqueous sodium bisulfite and finally with water. Separate the organic layer, dry over magnesium sulfate and concentrate in vacuo until a crystalline slurry is obtained. Add ethyl ether to the slurry and cool. Filter and dry the resultant precipitate comprising 16β-methyl-16α,17α-oxido-4,6-pregnadiene-3,20-dione, M.P. 168° C. (sinters 157° C.) $[\alpha]_D +71.1°$ C. (1% dioxane)

$\lambda_{max.}^{methanol}$ 283 mμ ϵ 23,189.

Yield 432 g. (82% theory). This product can be used without further purification in the following procedure of Example 3.

EXAMPLE 3

16β-methyl-6α,7α;16α,17α-bis-oxido-4-pregnene-3,20-dione (A) To a refluxing solution of 200 g. of 16β-methyl-16α,17α-oxido-4,6-pregnadiene-3,20-dione (M.P. 168° C.) in 1.5 liters of benzene, add over a half hour period a slurry of 250 g. of m-chloroperbenzoic acid in 1.25 liters of benzene. Heat the reaction mixture at reflux temperature for 2 hours longer, then cool at 30° C., dilute with ethyl ether and wash with 5% aqueous sodium hydroxide followed by several water washes. Separate the organic layer, dry over magnesium carbonate and concentrate in vacuo to a residue. Dissolve the residue in ethyl ether and allow this ether solution to stand at room temperature for about 17–20 hours until a heavy crystalline slurry is obtained. Filter and dry this crystalline slurry comprising 16β - methyl-6α,7α;16α,17α-bis-oxido-4-pregnene-3,20-dione, M.P. 198° C. $[\alpha]_D +82.4°$ (1% dioxane)

$\lambda_{max.}^{methanol}$ 240 mμ ϵ 14,800.

Yield=112 g. (53.5% theory).

This product can be used without further purification in the following procedure of Example 4.

(B(1)) Alternatively, the compound of this example is prepared as follows. To a solution of 25 g. of 16-methyl-4,6,16 - pregnatriene-3,20-dione (M.P. 213–215° C.) in 420 ml. of benzene add 49.0 g. of m-chloroperbenzoic acid. Heat the resulting solution at reflux temperature for 2 hours, cool to room temperature and add ethyl ether. Wash the ether solution with dilute sodium hydroxide followed by two water washes. Dry over magnesium sulfate and concentrate in vacuo to a residue comprising substantially 16β - methyl - 6α,7α;16α,17α-bis-oxido-4-pregnene-3,20-dione. Purify by two recrystallizations from methylene chloride-ethyl ether, M.P. 198° C.

(2) Alternatively, the compound of this example is prepared as follows. To a solution of 20 g. of 16-methyl-4,6,16-pregnatriene-3,20-dione in 500 ml. of methylene chloride add 46 g. of m-chloroperbenzoic acid and heat the resulting solution at reflux temperature for 2.5 hours. Cool the reaction mixture to room temperature, then neutralize with dilute aqueous sodium hydroxide. Separate the organic layer, wash with water and concentrate to a residue comprising 16β - methyl-6α,7α;16α,17α-bis-oxido-4-pregnene-3,20-dione. Purify by recrystallization from methylene chloride-ethyl acetate.

(3) Alternatively, the compound of this example is prepared as follows. Heat a mixture of 4,6,16-pregnatriene-3,20-dione (5 g.) and tert.-butanol (25 ml.) to reflux temperature. While stirring the slurry, add 7.98 g. meta-chloroperbenzoic acid as a solid in 4 equal portions over a 15 minute period. After the addition is complete continue stirring the refluxing solution for 30 minutes. Cool to 40° and add 10% aqueous sodium sulfite until any excess peracid is decomposed as determined by testing with starch-iodide paper. Pour the mixture into approximately 80 ml. ice water, and add 50 ml. methylene chloride. Adjust the pH of the aqueous layer to pH 11 by addition of aqueous sodium hydroxide. Separate the organic layer and extract the aqueous layer with 20 ml. methylene chloride. Wash the combined extracts to neutrality with water and evaporate to a residue comprising 16β-methyl-6α,7α;16α,17α-bis-oxido-4-pregnene-3,20-dione. Purify by crystallization by dissolving in methylene chloride and replacing with ether to yield 2.8 gms. (53% theory) which can be used without further purification as an intermediate in a process such as described in Example 4.

EXAMPLE 4

6β-chloro-7α,17α-dihydroxy-16-methylene-4-pregnene-3,20-dione

To a solution of 1.2 g. of 6α,7α;16α,17α-bis-oxido-16β-methyl-4-pregnene-3,20-dione (M.P. 198° C.) in 21.6 ml. of acetic acid, add 7.2 ml. of an 8% solution of hydrogen chloride in glacial acetic acid (weight/volume). Allow the reaction mixture to stand at room temperature for 6 hours, then filter the resultant precipitate, wash with 50% acetic acid, then water and air dry to give 6β-chloro-7α,17α-dihydroxy - 16 - methylene - 4 - pregnene-3,20-dione, M.P. 250° C. dec. $[\alpha]_D^{25}$ −59° C. (pyridine). Yield=1.15 g. (87.1% theory).

EXAMPLE 5

6β-chloro-7α,17α-diacetoxy-16-methylene-4-pregnene-3,20-dione (A) Suspend 70.0 g. of 6β-chloro-7α,17α-dihydroxy-16-methylene-4-pregnene-3,20-dione in 700 ml. glacial acetic acid, together with 7.0 g. p-toluenesulfonic acid hydrate. Cool to below 20° C. then rapidly add 250 ml. of trifluoroacetic anhydride maintaining the reaction temperature below 20° C. Allow the reaction mixture to warm to room temperature and to stay at room temperature for 3.5 hours. Add water to the reaction mixture, filter off the crude product and then wash it to neutrality with water. Dry the crude product and purify by recrystallization from ethyl acetate, filter and dry the resultant crystalline product comprising 6β-chloro-7α,17α-diacetoxy-16-methylene - 4 - pregnene - 3,20 - dione. M.P. 248–250° C. (sinters 225° C.) $[\alpha]_D^{25}$ −100.5° (dioxane)

$\lambda_{max.}^{methanol}$ 238 mμ ϵ=14,650.

Yield=55.2 g. (65.4% theory).

(B) Alternatively the compound of this example is also prepared as follows. Suspend 68.5 g. of 6β-chloro-16-methylene-7α,17α-dihydroxy-4-pregnene-3,20-dione in 685 ml. of glacial acetic acid together with 6.8 g. p-toluenesulfonic acid monohydrate. Cool the mixture to 20° C., then slowly add 274 ml. of acetic anhydride over a one-hour period. Warm the reaction mixture to 40° C. and allow it to stand for 18 hours. Pour the reaction mixture into 8 liters of water at 50° C. and agitate for 2 hours. Filter off the product, wash it to neutrality with cold water and dry the crude product at 60° C. The crude diacetate, 73.4 g., may be crystallized from ethyl acetate to give purified 6β-chloro-16-methylene-7α,17α-diacetoxy-4-pregnene-3,20-dione, 39.9 g. [M.P. 239–240° C., [α]=—100.6° (dioxane), $$\lambda_{max.}^{MeOH} \ 238 \ m\mu \ \epsilon=14,650,$$

Yield=40 g. (48.5% theory)].

EXAMPLE 6

6-chloro-16-methylene-17α-acetoxy-4,6-pregnadiene-3,20-dione (A) Dissolve 4 g. of 6β-chloro-16-methylene-4-pregnene-7α,17α-diol-3,20-dione 7,17-diacetate in 80 ml. of chloroform (pretreated over calcium chloride). Add gaseous hydrogen chloride for one hour, then stir the reaction mixture for 21 hours at room temperature. Wash the chloroform solution with water until the water extracts are neutral. Dry the chloroform solution over magnesium sulfate, filter and evaporate to an oily residue. Add ethyl ether and filter the resultant precipitate comprising 6-chloro - 16 - methylene-17α-acetoxy-4,6-pregnadiene-3,20-dione, M.P. 196° C. [α]$_D^{25}$ —136° (1% dioxane)

$$\lambda_{max.}^{methanol} \ 285 \ m\mu \ \epsilon=22,300.$$

Yield=2.97 g. (85% theory).

(B) Dissolve 38 g. of 6β-chloro-16-methylene-4-pregnene-7α,17α-diol-3,20-dione diacetate in 760 ml. of dry chloroform at room temperature. Pass dry hydrogen chloride gas into the reaction mixture for one hour at room temperature, then stir for an additional 3.5 hours. The course of the reaction is followed by ultraviolet spectroscopic evaluation of aliquots of the reaction mixture taken at intervals. After two hours (one hour after hydrogen chloride addition) the reaction is essentially complete. Isolate the product by adding water to the reaction mixture, stirring for 15 minutes, separating the chloroform solution, washing the chloroform solution with water followed by aqueous sodium bicarbonate solution and finally with water, then drying the chloroform over magnesium sulfate and concentrating to a small volume. Add methanol to this residue and concentrate the crystal slurry to 100 ml. Collect the resultant solid by filtration, wash with cold methanol and dry at 110° C. to yield 6-chloro-16-methylene - 17α-acetoxy-4,6-pregnadiene-3,20-dione, M.P. 200° C. [α]$_D^{25}$ —135.7° (1% dioxane), yield 27.0 g. (80% theory).

EXAMPLE 7

6-chloro-16-methylene-17α-hydroxy-4,6-pregnadiene-3,20-dione

To a suspension of 1.0 g. of 6β-chloro-7α,17α-dihydroxy-16-methylene-4-pregnene-3,20-dione in 20 ml. of chloroform (pretreated over calcium chloride) add gaseous hydrogen chloride at 25° C. until the solution is saturated. Stir the reaction mixture at 25° C. for 19 hours, then filter the insoluble material, wash the insoluble material with methylene chloride and dry to yield 550 mg. (55%) of the starting compound, i.e. 6β-chloro-7α,17α-dihydroxy-16-methylene-4-pregnene-3,20-dione.

Dilute the chloroform filtrate to 200 ml. with methylene chloride, wash to neutrality with water, dry over magnesium sulfate and evaporate to a residue. Purify the residue via thick layer chromatography utilizing as solvent system chloroform/ethyl acetate (9:1) and extracting with methylene chloride/chloroform (1:1). Concentrate the extract to a residue comprising 116 mg. of a mixture containing 6-chloro-16-methylene-17α-hydroxy-4,6-pregnadiene-3,20-dione as identified by thin layer chromatography, infrared and ultraviolet analysis. Purify by recrystallization from methanol to obtain 30 mgm. (3.1% theory) of 6-chloro-16-methylene-17α-hydroxy-4,6-pregnadiene-3,20-dione as determined by infrared and ultraviolet analysis.

$$UV=\lambda_{max.}^{methanol} \ 285 \ m\mu \ \epsilon \ 21,490$$

We claim:
1. 6α,7α;16α,17α - bis - oxido - 16β - methyl - 4 - pregnene-3,20-dione.
2. The process for preparing 6α,7α;16α,17α-bis-oxido-16β-methyl-4-pregnene-3,20-dione which comprises reacting 16-methyl-4,6,16-pregnatriene-3,20-dione with an epoxidizing reagent selected from the group consisting of an aromatic peracid, and alkaline hydrogen peroxide followed by an aromatic peracid.
3. The process according to claim 2 wherein the epoxidizing reagent is an aromatic peracid.
4. The process according to claim 2 wherein said aromatic peracid is meta-chloroperbenzoic acid, said process comprising reacting 16-methyl-4,6,16-pregnatriene-3,20-dione with an epoxidizing reagent selected from the group consisting of meta-chloroperbenzoic acid, and alkaline hydrogen peroxide followed by meta-chloroperbenzoic acid.
5. The process according to claim 2 wherein said epoxidizing reagent is meta-chloroperbenzoic acid, said process for preparing 6α,7α;16α,17α - bis - oxido - 16β-methyl - 4 - pregnene - 3,20 - dione comprising reacting 16-methyl-4,6,16-pregnatriene-3,20-dione with meta-chloroperbenzoic acid.
6. The process according to claim 2 wherein said epoxidizing reagent is meta-chloroperbenzoic acid and wherein the quantity of said reagent is at least two moles per mole of 16-methyl-4,6,16-pregnatriene-3,20-dione.
7. The process according to claim 2 wherein said epoxidizing reagent is meta-chloroperbenzoic acid; wherein the quantity of said reagent is at least two moles per mole of 16-methyl-4,6,16-pregnatriene-3,20-dione; and wherein said process is carried out in benzene.
8. The process according to claim 2 wherein said epoxidizing reagent is meta-chloroperbenzoic acid; the quantity of said reagent being at least two moles per mole of 16-methyl-4,6,16-pregnatrien-3,20-dione; and wherein said process is carried out in methylene chloride.
9. The process according to claim 2 wherein said epoxidizing reagent is meta-chloroperbenzoic acid; the quantity of said reagent being at least two moles per mole of 16-methyl-4,6,16-pregnatriene-3,20-dione; and wherein said process is carried out in tertiary butanol.
10. The process of claim 2 when said epoxidizing reagent is alkaline hydrogen peroxide followed by at least a molar quantity of meta-chloroperbenzoic acid per mole of 16-methyl-4,6,16-pregnatriene-3,20-dione, and wherein benzene is used as solvent with said meta-chloroperbenzoic acid, said process for preparing 6α,7α;16α,17α-bis-oxido-16β-methyl-4-pregnene-3,20-dione comprising reacting 16-methyl-4,6,16-pregnatriene-3,20-dione with alkaline hydrogen peroxide followed by treatment of 16β-methyl-16α,17α-oxido-4,6-pregnadiene-3,20-dione with at least a mole of meta-chloroperbenzoic acid in benzene per mole of 16-methyl-4,6,16-pregnatriene-3,20-dione.
11. The process of claim 2 when said epoxidizing reagent is alkaline hydrogen peroxide followed by at least a molar quantity of meta-chloroperbenzoic acid per mole of 16-methyl-4,6,16-pregnatriene-3,20-dione, and wherein there is used tertiary butanol as solvent with said meta-chloroperbenzoic acid, said process comprising reacting 16-methyl-4,6,16-pregnatriene-3,20-dione with alkaline hydrogen peroxide followed by treatment of 16β-methyl-

16α,17α-oxido-4,6-pregnadiene-3,20-dione with at least a mole of meta-chloroperbenzoic acid in tertiary butanol per mole of 16-methyl-4,6,16-pregnatriene-3,20-dione.

12. In the process of claim 10, the step which comprises reacting the 16β-methyl-16α,17α-oxido-4,6-pregnadiene-3,20-dione with at least a mole of meta-chloroperbenzoic acid in benzene.

13. In the process of claim 11, the step which comprises reacting the 16β-methyl-16α,17α-oxido-4,6-pregnadiene-3,20-dione with at least a mole of meta-chloroperbenzoic acid in tertiary butanol.

References Cited
UNITED STATES PATENTS 3,284,476  11/1966  Kincl _____ 260—397.4

LEWIS GOTTS, Primary Examiner
ETHEL G. LOVE, Assistant Examiner

U.S. Cl. X.R.

260—397.3, 397.4, 999